US012249499B2

(12) United States Patent
Yamaguchi

(10) Patent No.: US 12,249,499 B2
(45) Date of Patent: Mar. 11, 2025

(54) IMAGING MASS SPECTROMETER

(71) Applicant: SHIMADZU CORPORATION, Kyoto (JP)

(72) Inventor: Shinichi Yamaguchi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 568 days.

(21) Appl. No.: 17/439,998

(22) PCT Filed: Apr. 24, 2019

(86) PCT No.: PCT/JP2019/017369

§ 371 (c)(1),
(2) Date: Sep. 16, 2021

(87) PCT Pub. No.: WO2020/217334

PCT Pub. Date: Oct. 29, 2020

(65) Prior Publication Data

US 2022/0172937 A1 Jun. 2, 2022

(51) Int. Cl.
*H01J 49/00* (2006.01)

(52) U.S. Cl.
CPC ...... *H01J 49/0004* (2013.01); *H01J 49/0036* (2013.01)

(58) Field of Classification Search
CPC ............... H01J 49/0036; H01J 49/0027; H01J 49/0031; H01J 49/0004
See application file for complete search history.

(56) References Cited

U.S. PATENT DOCUMENTS

2019/0221409 A1 * 7/2019 Takeshita ............ H01J 49/0036
2019/0272984 A1 9/2019 Takeshita
(Continued)

FOREIGN PATENT DOCUMENTS

WO WO-2017195271 A1 * 11/2017 .......... H01J 49/0004
WO 2018/037491 A1 3/2018
WO 2018/109895 A1 6/2018

OTHER PUBLICATIONS

Phan et al., "MS/MS Analysis and Imaging of Lipids Across *Drosophila* Brain Using Secondary Ion Mass Spectrometry", Anal Bioanal Chem (2017) 409:3923-3932 (Year: 2017).*
(Continued)

*Primary Examiner* — David E Smith
(74) *Attorney, Agent, or Firm* — Sughrue Mion, PLLC

(57) ABSTRACT

An imaging mass spectrometer includes an analysis executing section that executes $MS^n$ analysis for a target component on each of a plurality of micro regions set within a two-dimensional measurement region on a sample to collect data; an ion selecting section that selects a plurality of kinds of product ions derived from, or assumed to be derived from, the target component based on at least a part of the data collected by the analysis executing section; and a distribution image creating section that determines, using signal strength of each of the kinds of product ions in each micro region within the measurement region. a small region in which all of the kinds of product ions are detected or a small region assumed to have high reliability that all of the kinds of product ions are derived from the target component, and creates a distribution image visualizing the small region.

6 Claims, 4 Drawing Sheets

(56) References Cited

U.S. PATENT DOCUMENTS

2020/0003739 A1 1/2020 Yamamoto et al.
2020/0141920 A1* 5/2020 Glazier .............. G01N 33/6848

OTHER PUBLICATIONS

N. Desbenoit, "Correlative mass spectrometry imaging, applying time-of-flight secondary ion mass spectrometry and atmospheric pressure matrix-assisted laser desorption/ionization to a single tissue section", Rapid Communication in Mass Spectrometry, Jan. 30, 2018, pp. 159-166, vol. 32, issue 2.
Nhu T. N. Phan et al., "MS/MS analysis and imaging of lipids across *Drosophila* brain using secondary ion mass spectrometry", Analytical and Bioanalytical Chemistry, Jun. 2017, pp. 3923-3932, vol. 409, issue 16.
"IMAGEREVAL MS" Instruction Manual, Shimadzu Corporation, Jan. 2019, pp. 1-272.
Shuichi Shimma et al., "Protocol for Quantitative Imaging Mass Spectrometry", Bunseki Kagaku, 2016, pp. 745-750, vol. 65, No. 12.
Written Opinion for PCT/JP2019/017369, dated Jul. 2, 2019.
International Search Report for PCT/JP2019/017369, dated Jul. 2, 2019.
Office Action dated Nov. 30, 2023 issued for the corresponding Chinese Patent Application No. 201980093553.7.

* cited by examiner

MS IMAGE OF PRODUCT ION A
(m/z=M1)

MS IMAGE OF PRODUCT ION B
(m/z=M2)

MS IMAGE BY LOGICAL
PRODUCT (AND) OF BOTH MS
IMAGES

IMAGING MASS SPECTROMETER

CROSS REFERENCE TO RELATED APPLICATIONS

This application is a National Stage of International Application No. PCT/JP2019/017369 filed Apr. 24, 2019.

TECHNICAL FIELD

The present invention relates to an imaging mass spectrometer configured to execute mass spectrometry for each of a large number of measurement points (micro regions) within a two-dimensional region on a sample or within a three-dimensional region in a sample.

BACKGROUND ART

In the imaging mass spectrometer, a two-dimensional intensity distribution of ions having a specific mass-to-charge ratio m/z on the surface of a sample such as a biological tissue section can be measured while observing the form of the surface of the sample with an optical microscope (see Patent Literature 1 etc.). In the imaging mass spectrometer, a mass spectrometry image (hereinafter, sometimes referred to as an MS image), which shows a two-dimensional intensity distribution of ions at various mass-to-charge ratios, can be created for one sample.

In a general imaging mass spectrometer, a matrix-assisted laser desorption/ionization (MALDI) method is used as an ionization method, and components in a sample are directly ionized by irradiation of laser light. Therefore, not only the component targeted by the user but also many other components existing at the same position or in its vicinity on the sample are ionized at the same time and subjected to mass spectrometry. Components having sufficiently different mass-to-charge ratios can be separated from each other in mass spectrometry, but particularly in the case of a sample derived from a living body, many of the different components have the same or close masses, and are often not sufficiently separated in mass spectrometry. Therefore, even if an MS image is created using a signal strength at a certain mass-to-charge ratio (m/z) value, there is a case where an MS image of another mass-to-charge ratio value within an allowable range of the mass-to-charge ratio value or an MS image of another component having the same mass-to-charge ratio is overlapped, and there is a problem that it is difficult to accurately grasp the two-dimensional distribution of the target component.

As a method for solving this problem, a method is known in which MS/MS analysis (or $MS^n$ analysis in which n is greater than or equal to 3) of a target component is executed, and an MS image is created using signal strength of product ions assumed to be generated from the target component.

CITATION LIST

Patent Literature

Patent Literature 1: WO 2018/037491 A

SUMMARY OF INVENTION

Technical Problem

In an ion dissociation operation in the MS/MS analysis (or $MS^n$ analysis), usually, a plurality of product ions having mass-to-charge ratios different from each other are generated from one precursor ion derived from one component. Therefore, peaks of the plurality of kinds of product ions derived from the one component are observed in the product ion spectrum. Furthermore, since a precursor ion derived from another component may have the same mass-to-charge ratio, a peak of product ions derived from the other component different from the one component is also observed in the product ion spectrum. In addition, if a precursor ion is selected in an ion trap or the like, an ion or ions whose mass-to-charge ratio fall within a mass-to-charge ratio range having a certain width are also selected. Thus, if another component whose mass-to-charge ratio is close to the mass-to-charge ratio of the target component exists, a peak or peaks of the product ion derived from such another component are also observed in the product ion spectrum.

As described above, peaks derived from a plurality of kinds of product ions derived from a target component and a plurality of kinds of product ions derived from components other than the target component are observed in the product ion spectrum. Conventionally, only one kind of a specific product ion assumed to be derived from a target component is selected among the product ions, and only an MS image showing the strength distribution of the ion is created.

In particular, in a sample derived from a living body, a plurality of components having very similar chemical structures and similar molecular weights may coexist, and if ions derived from such a plurality of components are simultaneously selected as precursor ions and MS/MS analysis is performed, product ions derived from the plurality of components and having the same partial structure may be generated. When such product ions are selected to create an MS image, regions where a plurality of components are distributed are overlapped, and the distribution of the target component cannot be accurately obtained.

The present invention has been made to solve the above problems, and a main object is to provide an imaging mass spectrometer capable of obtaining an accurate MS image more suited to user's intention and purpose by effectively using information obtained by performing $MS^n$ analysis in which n is greater than or equal to 2.

Solution to Problem

An imaging mass spectrometer according to one aspect of the present invention includes, an analysis executing section configured to execute $MS^n$ analysis (n is an integer greater than or equal to 2) for a target component on each of a plurality of micro regions set within a two-dimensional measurement region on a sample or a three-dimensional measurement region in the sample to collect data;

an ion selecting section configured to select a plurality of kinds of product ions derived from the target component or assumed to be derived from the target component based on at least a part of the data collected by the analysis executing section; and a distribution image creating section configured to determine, using signal strength of each of the plurality of kinds of product ions in each micro region within the measurement region, a small region in which all of the plurality of kinds of product ions are detected or a small region assumed to have high reliability that all of the plurality of kinds of product ions are derived from the target component, and configured to create a distribution image visualizing the small region.

Advantageous Effects of Invention

In a conventional general imaging mass spectrometer, a distribution image, that is, an MS image is created using signal strength of one kind of product ion assumed to be derived from a target component. On the other hand, in the imaging mass spectrometer according to one aspect of the present invention, a distribution image is created using signal strengths of a plurality of kinds of product ions having different mass-to-charge ratios, which are found to be derived from a target component or assumed to be derived from the target component. Thus, according to the imaging mass spectrometer of one aspect of the present invention, the influence of components different from the target component can be eliminated, and a highly accurate MS image for the target component according to the intention and purpose of the user can be obtained.

DESCRIPTION OF EMBODIMENTS

Hereinafter, one embodiment of an imaging mass spectrometer according to the present invention will be described with reference to the accompanying drawings.

[Configuration of Device of Present Embodiment]

Figure 1:
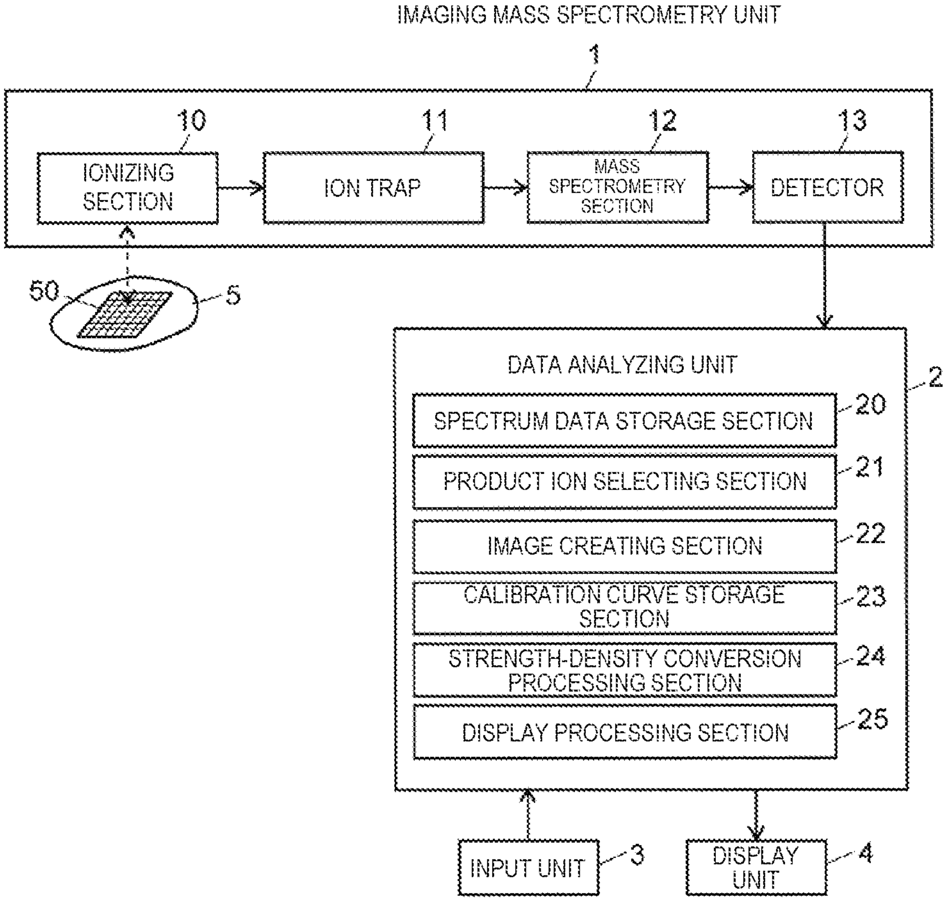
FIG. 1 is a configuration diagram of a main part of an imaging mass spectrometer according to one embodiment of the present invention.

FIG. 1 is a schematic block configuration diagram of an imaging mass spectrometer of the present embodiment.

The imaging mass spectrometer of the present embodiment includes an imaging mass spectrometry unit 1, a data analyzing unit 2, an input unit 3, and a display unit 4.

The imaging mass spectrometry unit 1 executes imaging mass spectrometry on a sample and is capable of performing $MS^n$ analysis, where n is greater than or equal to 2. That is, the imaging mass spectrometry unit 1 includes an ionizing section 10, an ion trap 11, a mass spectrometry section 12, and a detector 13.

The ionizing section 10 is, for example, an ion source by an atmospheric pressure matrix-assisted laser desorption/ionization (AP-MALDI) method that irradiates a sample with laser light under an atmospheric pressure atmosphere to ionize a substance in the sample.

The ion trap 11 is, for example, a three-dimensional quadrupole type or linear type ion trap, and temporarily traps ions derived from a sample component, and performs a selection operation of ions having a specific mass-to-charge ratio and a dissociation operation of the selected ion (precursor ion). The ion dissociation operation can be performed by utilizing, for example, collision-induced dissociation (CID).

The mass spectrometry section 12 separates ions discharged from the ion trap 11 with high mass accuracy and mass resolution, and for example, a time-of-flight mass spectrometer or a Fourier transform mass spectrometer such as a Fourier transform ion cyclotron resonance (FT-ICR) type can be used.

In the imaging mass spectrometry unit 1, a position irradiated with laser light for ionization by the ionizing section 10 is scanned within a two-dimensional measurement region 50 on a sample 5 such as a biological tissue section, and mass spectrometry is performed for each of a large number of measurement points (substantially micro regions) in the measurement region 50, whereby mass spectrum data over a predetermined mass-to-charge ratio range can be acquired. In addition, product ion spectrum data over a predetermined mass-to-charge ratio range can be acquired by performing $MS^n$ analysis targeting a mass-to-charge ratio designated in advance at a large number of measurement points in the measurement region 50 on the sample 5.

The data analyzing unit 2 receives the mass spectrum data or product ion spectrum data (hereinafter, it may be simply referred to as spectrum data) for each of a large number of measurement points (micro regions) obtained by the imaging mass spectrometry unit 1, and performs analysis processing based on the data. The data analyzing unit 2 includes, as functional blocks, a spectrum data storage section 20, a product ion selecting section 21, an image creating section 22, a calibration curve storage section 23, a strength-density conversion processing section 24, and a display processing section 25 in order to perform characteristic analysis processing described later.

Although the data analyzing unit 2 can be configured by a hardware circuit, the data analyzing unit 2 is generally a computer such as a personal computer or a high-performance workstation. Each of the functional blocks can be embodied by executing, on the computer, dedicated data analysis software installed in the computer. In this case, the input unit 3 is a keyboard or a pointing device (such as a mouse) attached to the computer, and the display unit 4 is a display monitor.

[Analyzing Operation in Device of Present Embodiment]

In the imaging mass spectrometer of the present embodiment, mass spectrometry imaging data is collected as follows.

The user specifies the molecular weight of the target component or the mass-to-charge ratio of the precursor ion derived from the target component by the input unit 3 as one of the $MS^n$ analysis conditions. Of course, normal imaging mass spectrometry (that is, without dissociating ions) may be performed prior to the $MS^n$ analysis, and precursor ions to be $MS^n$ analyzed may be determined using the result. When the molecular weight of the target component or the mass-to-charge ratio of the precursor ion derived from the component is specified as described above, the mass-to-charge ratio range of the precursor ions having a mass tolerance width determined in advance is determined.

The imaging mass spectrometry unit 1 executes normal mass spectrometry on the determined mass-to-charge ratio range of the precursor ions for each of a large number of measurement points set within the measurement region 50 on the sample 5 to acquire signal strength data. Here, scan measurement over a predetermined mass-to-charge ratio range may be executed, and from the result, only the signal strength for the mass-to-charge ratio range of the precursor ions may be extracted. Subsequently, MS/MS analysis by product ion scan measurement on the determined mass-to-charge ratio range of the precursor ions is executed for each of a large number of measurement points set within the measurement region 50 on the sample 5 to acquire product ion spectrum data. All the obtained data are transferred from the imaging mass spectrometry unit 1 to the data analyzing unit 2 and stored in the spectrum data storage section 20.

[MS Image Creating Process in Device of Present Embodiment]

When the user performs a predetermined operation on the input unit 3 while the spectrum data for one sample 5 as described above is stored in the spectrum data storage section 20, the data analyzing unit 2 executes the following characteristic MS image creating process using the data saved in the spectrum data storage section 20. FIGS. 2 and 3A to 3C are explanatory diagrams of the MS image creating process.

The product ion selecting section 21 selects a plurality of kinds of product ions to be used for creating an MS image. This selection can be performed by either a method based on specification by the user or a method automatically performed regardless of the specification by the user. In the former method, for example, when the user specifies the molecular weight of the target component or the mass-to-charge ratio of the precursor ion derived from the target component in advance as described above, the user also specifies a plurality of kinds of product ions expected to be generated (that is, possibly generated) from the target component.

Figure 2:
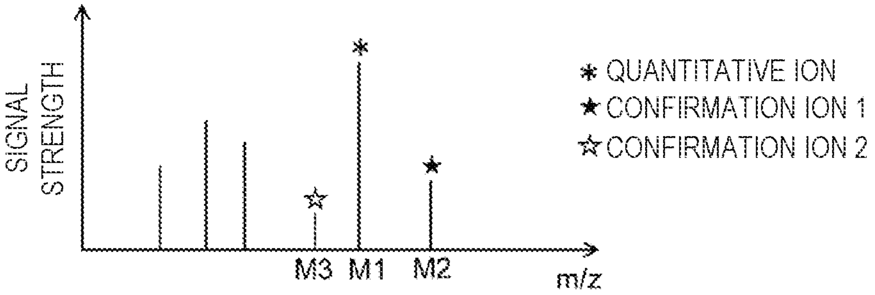
FIG. 2 is an explanatory diagram of a characteristic analysis processing in the imaging mass spectrometer of the present embodiment.

In general, in the case of quantitative analysis using mass spectrometry, one quantitative ion and one or a plurality of confirmation ions derived from a target component are specified in advance (see FIG. 2). The quantitative ion is literally an ion used exclusively for quantification, and the confirmation ion is an ion for confirming whether or not the quantitative ion is a pure ion derived from a target component (whether or not there is overlap of ions derived from other components). Therefore, such quantitative ion and confirmation ion may be specified as product ions expected to be generated from the target component.

On the other hand, when the mass accuracy of the mass spectrometry section 12 is high to a certain extent, a plurality of kinds of product ions can be automatically selected. In this case, first, an average product ion spectrum in which, for example, an average of signal strengths at all measurement points is calculated for each mass-to-charge ratio value is created from spectrum data at a large number of measurement points obtained for one sample 5. Instead of the average product ion spectrum, for example, a product ion spectrum in which the maximum signal strength is selected among all the measurement points for each mass-to-charge ratio may be used. Then, a peak is detected in the obtained product ion spectrum, a precise mass-to-charge ratio value of each detected peak is obtained, and a composition formula of the product ion is presumed from the mass-to-charge ratio value. In addition, the composition formula of the precursor ion or the target component (compound) is presumed from the precise mass-to-charge ratio value of the precursor ion (or the accurate molecular weight of the target component). Then, product ions that cannot be theoretically generated from the target component are excluded by comparing the composition formula of the precursor ion or the target component with the composition formula of the product ion, so that the product ion expected to be derived from the target component can be obtained.

Furthermore, when impurities are assumed to a certain extent and there is a possibility that ions derived from the impurities are observed in the product ion spectrum corresponding to the target component, the ions derived from the impurities may be excluded from the selection target of the product ions. In addition, in a case where ions derived from impurities that have a possibility of being observed in the product ion spectrum corresponding to the target component are known from various other prior information, these ions may also be excluded from the product ion selection target.

Next, the image creating section 22 reads out data obtained for the plurality of kinds of product ions selected by the product ion selecting section 21 from the spectrum data storage section 20, and creates an MS image for each of the product ions. In general, when an MS image is created, a distribution image is created in which the signal strength is associated with a color scale (or gray scale), and the magnitude of the signal strength can be visually recognized with a difference in color. Here, such a distribution image may be created, but for example, a binary image (for example, a black-and-white image) for distinguishing between a measurement point where the signal strength is greater than or equal to a predetermined threshold value (or may be "the signal strength is other than zero") and other measurement points may be created.

Figure 3A:
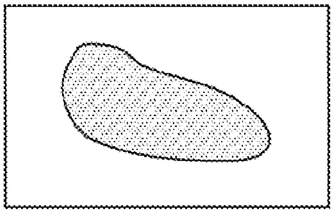
FIGS. 3A to 3C are explanatory diagrams of characteristic analysis processing in the imaging mass spectrometer of the present embodiment.
Figure 3B:
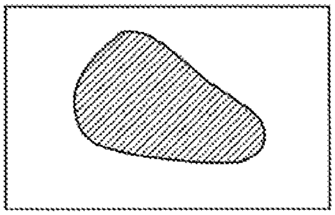
Figure 3C:
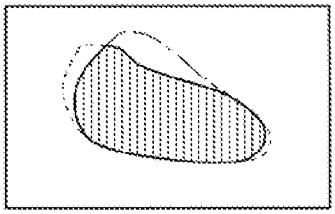

Furthermore, the image creating section 22 creates a new MS image by performing logical product (AND) operation process based on a plurality of kinds of MS images. In the "logical product operation processing" referred to here, when the MS image corresponding to each product ion is the binary image as described above, a new MS image may be created by performing the logical product operation for each measurement point. As is well known, in the logical product operation with respect to two values, the value is "1" only when both are "1", and thus if the value of the measurement point at which the product ion exists is "1", the value of the measurement point at which a plurality of kinds of product ions exist together becomes "1", and the value of the measurement point at which any of the plurality of kinds of product ions do not exist becomes "0". Therefore, as illustrated in FIGS. 3A to 3C, when the logical product operation processing of the MS image with respect to each of the product ions A and B is performed, an MS image in which a small region where both product ions A and B exist is clearly indicated is obtained.

Furthermore, in a case where the MS image corresponding to each product ion is a heat map-like image in which the signal strength value is represented according to a color scale (or gray scale) (that is, in a case where the signal strength value at each measurement point is not binary), the "logical product operation processing" may be to perform, for each measurement point, processing of setting the signal strength value at the measurement point to zero when the signal strength is zero or less than a predetermined value in any one of the plurality of kinds of MS images, and selecting any one of the signal strength values or adding all the signal strength values when the signal strength is not zero or greater than or equal to a predetermined value in all the plurality of kinds of MS images. Even when such processing is performed, an MS image in which a small region where the plurality of kinds of product ions exist together is clearly indicated can be obtained.

Note that it is preferable to enable the user to select the number of kinds of product ions to be subjected to the logical product operation processing, the MS image of which product ion is to use, and the like. For example, even in a case where three or more kinds of product ions expected to be generated from the target component are specified, it is possible to perform processing using the product ion that has been favorably detected as a result of the actual analysis by determining a rule such as performing logical product operation processing on the MS images of two kinds of product ions having a high average value of signal strengths among the product ions. Of course, logical product operation processing targeting on the MS images of three or more kinds of product ions may be performed to obtain a new MS image.

Figure 4A:
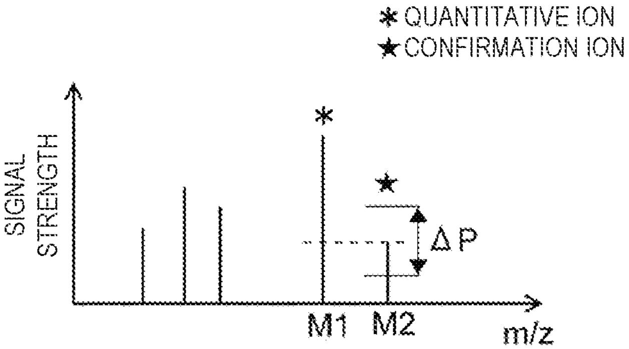
FIGS. 4A to 4C are explanatory diagrams of another example of characteristic analysis processing in the imaging mass spectrometer of the present embodiment.
Figure 4B:
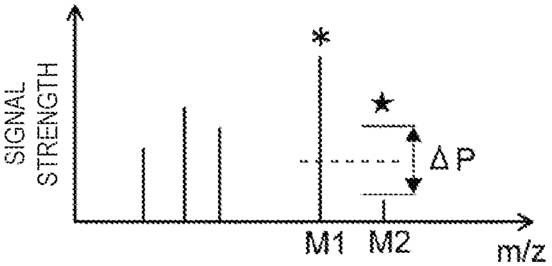
Figure 4C:
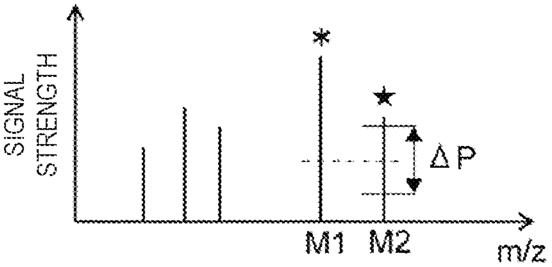

Furthermore, the image creating section 22 may obtain a new MS image by other processing different from the logical product operation processing as described below. FIGS. 4A to 4C are explanatory diagrams of this processing.

As described above, the confirmation ion is usually used to confirm whether or not the quantitative ion is an ion derived from the target component. The confirmation is performed by determining whether or not an actually measured signal strength ratio of the quantitative ion and the confirmation ion falls within an allowable range of a confirmation ion ratio determined in advance. Therefore, the image creating section 22 obtains an actually measured signal strength ratio between the quantitative ion and the confirmation ion in the product ion spectrum for each measurement point, and determines whether or not the signal strength ratio falls within a predetermined allowable range ΔP. FIG. 4A is an example of a case where the signal strength ratio falls within the allowable range ΔP, and FIGS. 4B and 4C are examples of a case where the signal strength ratio deviates from the allowable range ΔP. Instead of the signal strength ratio between the quantitative ion and the confirmation ion, the signal strength ratio of a plurality of kinds of confirmation ions may be used.

Then, only the measurement point where the actually measured signal strength ratio is confirmed to fall within the allowable range ΔP is regarded as an effective measurement point, where the signal strength value of the quantitative ion (or confirmation ion) is adopted at the effective measurement point, and even if the signal strength of the quantitative ion is large at the ineffective measurement point, such signal strength value is replaced with zero to create the MS image. This means that the MS image is created using only the signal strength of the measurement point at which determination can be made that the reliability that the quantitative ion is derived from the target component is high in the product ion spectrum. Therefore, for example, when a peak of a quantitative ion derived from a target component is overlapped with a peak of an ion derived from another component in a product ion spectrum, information of the peak of the quantitative ion is not reflected on the MS image, and an MS image of higher precision regarding the target component can be obtained.

As described above, the display processing section 25 receives the MS image created based on the signal strengths of the plurality of kinds of product ions in the image creating section 22, and displays the MS image on the screen of the display unit 4. An MS image of higher precision regarding the target component thus ca be provided to the user.

[Density Image Creating Process in Device of Present Embodiment]

The MS image displayed as described above is an image reflecting the distribution of the signal strength of the detected ion, and does not necessarily reflect the distribution of the density (abundance) of the target component. On the other hand, in the mass spectrometer of the present embodiment, an image indicating the distribution of the density of the target component is created and displayed by the following process.

In general, in the quantitative analysis in mass spectrometry, a calibration curve (calculation formula or table) for converting a signal strength value into a density value is used. The calibration curve is created based on a result of actually measuring a sample (generally, a standard sample) whose density is known. In the quantitative analysis in $MS^n$ analysis, a calibration curve is usually created using signal strength of the quantitative ions derived from a target component, but there are a case where the quantitative ion is not detected with sufficient strength, a case where a peak of an ion derived from another component overlaps the peak of the quantitative ion and reliability of signal strength of the peak is low, and the like.

Figure 5:
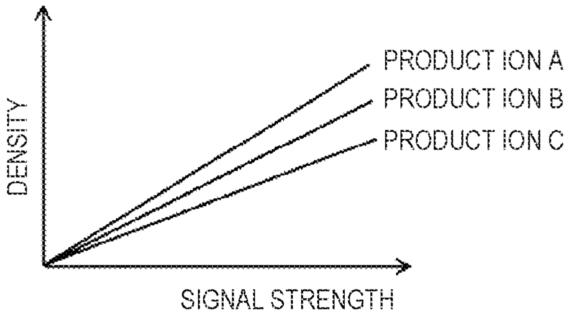
FIG. 5 is an explanatory diagram of quantitative processing in the imaging mass spectrometer of the present embodiment.

Therefore, in the imaging mass spectrometer of the present embodiment, as a calibration curve for quantifying a target component, a calibration curve is created in advance for each of a plurality of kinds of product ions derived from the target component, and the calibration curve is stored in the calibration curve storage section 23. In a case where the dissociation efficiency in dissociating ions in the ion trap 11 depends on the density, as shown in FIG. 5, even if the ions are derived from one target component, the slope or curve of the calibration curve varies depending on the kinds of product ions. In FIG. 5, the slopes of three types of calibration curves are clearly made different for easy understanding, but actually, the difference among the plurality of calibration curves is not so large in many cases.

When the user specifies one MS image with the input unit 3 and then instructs to display a density image, the strength-density conversion processing section 24 acquires data constituting the specified one MS image, and converts a signal strength value into a density value for each measurement point using one of a plurality of types of calibration curves corresponded with the target component.

Specifically, for example, when a signal strength value of one product ion of a plurality of kinds of product ions is used in creating an MS image, a calibration curve corresponding to the product ion may be used, but since calibration curves for all product ions are not necessarily prepared, there may be no corresponding calibration curve. Therefore, in that case, for example, the signal strength value may be converted into the density value using a calibration curve corresponding to the product ion having the closest mass-to-charge ratio.

In addition, the strength-density conversion processing section 24 may convert the signal strength value into a density value by using calibration curves for a plurality of kinds of different product ions corresponded with the target component, and obtain one density value from a plurality of density values obtained for each signal strength value by the following calculation or process.

That is, when a plurality of density values for a certain signal strength value is obtained based on a plurality of calibration curves, the average of the plurality of density values can be calculated and determined as the density value. Furthermore, the average of the product ion spectra at all measurement points within the measurement region 50 may be calculated, a product ion exhibiting the highest signal strength in the obtained average product ion spectrum may be found, and a density value obtained using a calibration curve corresponding to the product ion may be adopted. In addition, instead of using one calibration curve for all the measurement points within the measurement region 50, a product ion exhibiting the highest signal strength may be found using the product ion spectrum at each measurement point, and for each measurement point, a density value obtained using the calibration curve corresponding to the product ion may be adopted.

Furthermore, when a plurality of density values for a certain signal strength value is obtained based on a plurality of calibration curves, a more appropriate one density value may be obtained using the least square method for the plurality of density values. In addition, when there are three or more density values for a certain signal strength value, one density value may be obtained by processing of excluding the minimum value and the maximum value and averaging the remaining one or more density values. Furthermore, it is also conceivable to adopt a median value among a plurality of density values. In any case, the density value of each measurement point corresponding to one MS image can be obtained by obtaining one density value using one of a plurality of calibration curves, obtaining one density value using one calibration curve obtained from a plurality of calibration curves, or obtaining one density value by calculation or selection based on a plurality of density values obtained using a plurality of calibration curves.

As described above, the display processing section 25 receives the data converted into the density value for each measurement point by the strength-density conversion processing section 24, creates, for example, a density image by corresponding the density value with the display color according to the color scale, and displays the density image on the screen of the display unit 4. This makes it possible to provide an image indicating the density distribution of the target component to the user.

Modified Example

Note that, in the device of the embodiment described above, the measurement region on the sample is two-dimensional, but it is a matter of course that the present invention can also be used in a case where the measurement region is three-dimensional.

In the device according to the embodiment described above, product ions obtained as a result of the $MS^2$ analysis are used, but product ions obtained as a result of $MS^n$ analysis, in which n is greater than or equal to 3, such as $MS^3$ analysis and $MS^4$ analysis may be used.

Furthermore, the above-described embodiments and modified examples are merely examples of the present invention, and it is a matter of course that modifications, corrections, additions, and the like appropriately made within the scope of the gist of the present invention are included in the claims of the present application.

Various Aspects

The embodiment of the present invention has been described above with reference to the drawings, and lastly, various aspects of the present invention will be described.

An imaging mass spectrometer according to a first aspect of the present invention includes,

- an analysis executing section configured to execute $MS^n$ analysis (n is an integer greater than or equal to 2) for a target component on each of a plurality of micro regions set within a two-dimensional measurement region on a sample or a three-dimensional measurement region in the sample to collect data;
- an ion selecting section configured to select a plurality of kinds of product ions derived from the target component or assumed to be derived from the target component based on at least a part of the data obtained by the analysis executing section; and
- a distribution image creating section configured to determine a small region in which all of the plurality of kinds of product ions are detected or a small region assumed to have high reliability that all of the plurality of kinds of product ions are derived from the target component in the measurement region using signal strength in each micro region within the measurement region for each of the plurality of kinds of product ions to create a distribution image visualizing a small region.

According to the first aspect of the present invention, a distribution image is created using signal strengths of a plurality of kinds of product ions having different mass-to-charge ratios, which are found to be derived from a target component or assumed to be derived from the target component. Therefore, the influence of a component different from the target component can be eliminated, and a highly accurate MS image for the target component according to the intention and purpose of the user can be obtained.

An imaging mass spectrometer according to a second aspect of the present invention is such that, in the first aspect,

- the distribution image creating section can determine regions where each of the plurality of kinds of product ions are detected, determine a small region in which the regions overlap, and create a distribution image visualizing the small region.

An imaging mass spectrometer according to a third aspect of the present invention is such that, in the first aspect,

- the distribution image creating section can obtain a small region where micro regions in which signal strength ratios of the plurality of kinds of product ions fall within a predetermined range are collected, and create a distribution image visualizing the small region.

According to the second and third aspects of the present invention, a distribution image visualizing a small region where it can be assumed with high reliability that product ions derived from a target component exist is obtained, and hence an MS image with higher accuracy can be obtained for the target component.

An imaging mass spectrometer according to a fourth aspect of the present invention further includes, in the first aspect,

- a calibration curve storage section configured to store a plurality of calibration curves created in advance using a plurality of kinds of product ions derived from the target component; and
- a density image creating section configured to convert a signal strength into a density using one of the plurality of calibration curves stored in the calibration curve storage section for each micro region in the distribution image created by the distribution image creating section, and creates an image indicating a distribution of the density.

An imaging mass spectrometer according to a fifth aspect of the present invention is such that, in the fourth aspect,

- when the calibration curve corresponding to the product ion used in the distribution image is not in the plurality of calibration curves, the density image creating section can calculate the density using a calibration curve having the highest reliability for the product ion among the plurality of calibration curves.

Here, the "calibration curve having the highest reliability for the product ion" is, for example, a calibration curve corresponding to the product ion having a mass-to-charge ratio closest to the mass-to-charge ratio of the product ion.

According to the fourth or fifth aspect of the present invention, even when the relationship between the density and the signal strength is different in a plurality of kinds of product ions derived from the same component, a density image reflecting the density of the target component with high accuracy can be provided to the user.

An imaging mass spectrometer according to a sixth aspect of the present invention further includes, in the first aspect, a calibration curve storage section configured to store a plurality of calibration curves created in advance using each of a plurality of kinds of product ions derived from the target component; and a density image creating section configured to obtain a plurality of densities from signal strengths using the plurality of calibration curves stored in the calibration curve storage section for each micro region in the distribution image created by the distribution image creating section, select one density from the plurality of densities or make one density by calculation, and create an image indicating distribution of density based on the density of each micro region.

According to the sixth aspect of the present invention, similarly to the fourth aspect, even when the relationship between the density and the signal strength is different in a plurality of kinds of product ions derived from the same component, a density image reflecting the density of the target component with high accuracy can be provided to the user.

REFERENCE SIGNS LIST

1 . . . Imaging Mass Spectrometry Unit
10 . . . Ionizing Section
11 . . . Ion Trap
12 . . . Mass Spectrometry Section
13 . . . Detector
2 . . . Data Analyzing Unit
20 . . . Spectrum Data Storage Section
21 . . . Product Ion Selecting Section
22 . . . Image Creating Section
23 . . . Calibration Curve Storage Section
23 . . . Region Inclusion Relationship Determining Section
24 . . . Density Conversion Processing Unit
25 . . . Display Processing Section
3 . . . Input Unit
4 . . . Display Unit

The invention claimed is:

1. An imaging mass spectrometer comprising:

an analysis executing section configured to execute $MS^n$ analysis (n is an integer greater than or equal to 2) for a target component on each of a plurality of micro regions set within a two-dimensional measurement region on a sample or a three-dimensional measurement region in the sample to collect data;

an ion selecting section configured to select a plurality of kinds of product ions which are known to be derived from the target component or presumed to be derived from the target component based on a comparison of a compositional formula of the target component or a precursor ion in an $MS^n$ analysis and a compositional formula of the product detected in the $MS^n$ analysis based on at least a part of the data collected by the analysis executing section; and a distribution image creating section configured to determine, using signal strength of each of the plurality of kinds of product ions in each micro region within the measurement region, a small region in which all of the plurality of kinds of product ions are detected or a small region assumed to have high reliability that all of the plurality of kinds of product ions are derived from the target component, and configured to create a distribution image visualizing the small region.

2. The imaging mass spectrometer according to claim 1, wherein the distribution image creating section determines regions where each of the plurality of kinds of product ions are detected, determines a small region in which the regions overlap, and creates a distribution image visualizing the small region.

3. The imaging mass spectrometer according to claim 1, wherein the distribution image creating section determines a small region where micro regions in which signal strength ratios of the plurality of kinds of product ions fall within a predetermined range are collected, and creates a distribution image visualizing the small region.

4. The imaging mass spectrometer according to claim 1, further comprising:

a calibration curve storage section configured to store a plurality of calibration curves created in advance using a plurality of kinds of product ions derived from the target component; and a density image creating section configured to convert a signal strength into a density using one of the plurality of calibration curves stored in the calibration curve storage section for each micro region in the distribution image created by the distribution image creating section, and create an image indicating a distribution of the density.

5. The imaging mass spectrometer according to claim 4, wherein when the calibration curve corresponding to the product ion used in the distribution image is not in the plurality of calibration curves, the density image creating section calculates the density using a calibration curve having the highest reliability for the product ion among the plurality of calibration curves.

6. The imaging mass spectrometer according to claim 1, further comprising:

a calibration curve storage section configured to store a plurality of calibration curves created in advance using each of a plurality of kinds of product ions derived from the target component; and a density image creating section configured to obtain a plurality of densities from signal strengths using the plurality of calibration curves stored in the calibration curve storage section for each micro region in the distribution image created by the distribution image creating section, select one density from the plurality of densities or make one density by calculation, and create an image indicating distribution of density based on the density of each micro region.

* * * * *